W. H. BARTON.
Horse Hay-Rake.
No. 80,383.　　　　　　　　　　Patented July 28, 1868.
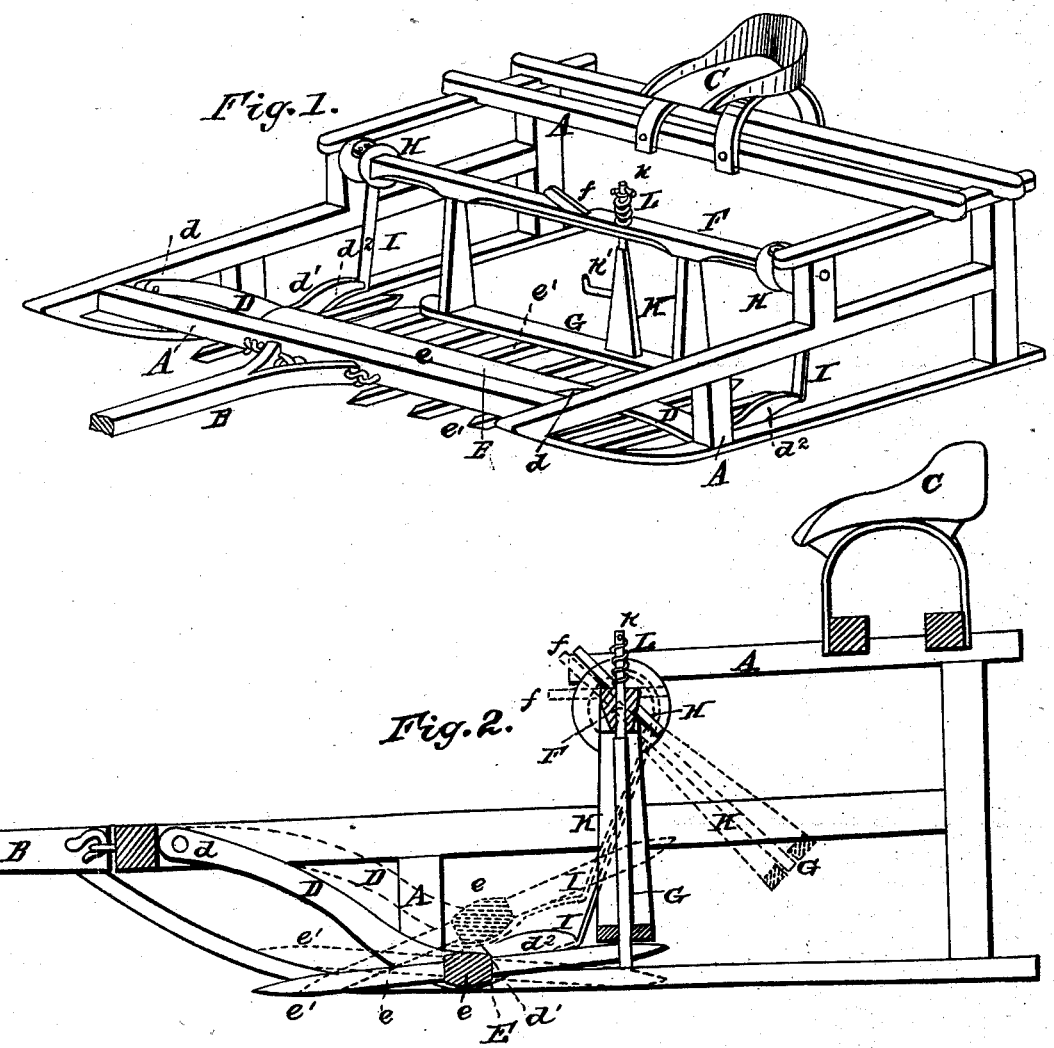

United States Patent Office.

WILLIAM H. BARTON, OF OLNEY, ILLINOIS.

Letters Patent No. 80,383, dated July 28, 1868.

IMPROVEMENT IN HORSE-RAKES.

The Schedule referred to in these Letters Patent and making part of the same.

TO ALL WHOM IT MAY CONCERN:

Be it known that I, WILLIAM H. BARTON, of Olney, in the county of Richland, and State of Illinois, have invented a new and useful Improvement in Horse Hay-Rakes; and I do hereby declare the following to be a full, clear, and exact description thereof, reference being had to the accompanying drawing, which is made a part of this specification.

The subject of my invention is a horse hay-rake, of that class in which the rake proper consists of two sets of teeth, arranged on opposite sides of a pivoted head, the hay being discharged therefrom by allowing its front teeth to engage in the ground, thus, by the continued forward movement of its supporting sled, causing it to revolve, depositing its load in the windrow, and bringing the teeth previously behind into action.

My improvements consist in pivoting the rake in a pair of runners, supplemental to the main sled or vehicle, so as to allow it to conform to irregularities in the surface of the ground, independent of the main sled; also, in novel and simple devices, adapted to be operated by the feet of the driver, for holding and facilitating the turning of the rake, and adapting it to ride over obstructions.

In the drawing—

Figure 1 is a perspective view of a rake embodying my improvements.

Figure 2, a longitudinal section, representing, in different colors, the relative positions of the various parts, at different stages of its operation.

A may represent a sled, of suitable form and material to adapt it for the use for which it is employed; B is the tongue, and C the driver's seat.

D D are a pair of additional or supplemental runners, parallel to those of the main sled, to which they are attached by a pivot or hinge-joint at $d$. Pivoted in said runners D, at their lowest point, $d$, is the rake E, which is of ordinary construction, consisting of an axial or longitudinal head, $e$, provided, on opposite sides, with corresponding teeth, $e^1$.

F is a rock-shaft, mounted transversely of the sled A, parallel with the rake E, and within convenient reach of the driver's seat, $c$, it being provided with a treadle, $f$, by which to operate it.

G is a gravitating frame, depending from the rock-shaft F. Against the under side of this frame the rear teeth of the rake E rest, while the others are gathering a load, the depth of said frame being such as to allow the point of the front teeth to be sufficiently near the ground, when the rear ones are in contact with it, as represented in fig. 1, and in black lines in fig. 2.

The rock-shaft F is further provided with suitable pulleys, H H, to which are attached straps, I I, connecting them to the rear upturned ends $d^2$ of the runners D, for the purpose of elevating said runners, and, consequently, the axis of the rake, by the movement of the rock-shaft releasing the rear teeth, as represented in red lines in fig. 2.

When the load is discharged, the driver presses on the rear end of the treadle $f$, or withdraws his foot from it, when the runners and rake will drop, and the frame G swing over it a sufficient distance to allow the rear teeth to pass over the windrow, when it will gravitate to its former position over the rear ends of the teeth, and the operation go on as before.

K is a presser-rod, sliding in suitable apertures in the shaft F and lower bar of the frame G, directly over one of the rear teeth of the rake E. This rod is held in its elevated position, as represented in fig. 1, and in black lines in fig. 2, with its lower end even with the bottom of the frame G, by the coiled spring L, which surrounds the upper end of said bolt, above the shaft F, and exerts its expansive force against the pin, $k$.

$k'$ is a stirrup or treadle, provided on the side of said presser-rod, at a convenient height for the driver's foot, by which to depress it, and with it the rear teeth of the rake, for the purpose of elevating the front teeth, in passing over obstructions or rapid elevations in the surface of the ground, as represented in blue lines in fig. 2.

Having thus described my invention, the following is what I claim as new, and desire to secure by Letters Patent:

1. In combination with the main sled or vehicle A, and revolving rake E, I claim the supplemental hinged runners D D, employed and operating in the manner and for the purpose set forth.

2. I claim the swinging frame F, $f$, G, arranged and employed substantially as and for the purpose described.

3. I claim the combination, with the supplemental runners D and rake E, of the straps I I, pulleys H H, rock-shaft F, and treadle $f$, substantially as and for the purpose specified.

4. I claim the presser-bar K, provided with the spring L and treadle $k'$, and arranged and employed, in combination with the rake E and swinging frame G, substantially as and for the purpose set forth.

WM. H. BARTON.

Witnesses:
    E. KITCHELL,
    J. C. BROCKMAN.